United States Patent
Juvekar

(10) Patent No.: US 8,499,357 B1
(45) Date of Patent: Jul. 30, 2013

(54) SIGNING A LIBRARY FILE TO VERIFY A CALLBACK FUNCTION

(75) Inventor: Prashant R. Juvekar, Littleton, MA (US)

(73) Assignee: EMC Corporation, Hopkinton, MA (US)

( * ) Notice: Subject to any disclaimer, the term of this patent is extended or adjusted under 35 U.S.C. 154(b) by 332 days.

(21) Appl. No.: 12/892,417

(22) Filed: Sep. 28, 2010

Related U.S. Application Data

(60) Provisional application No. 61/371,373, filed on Aug. 6, 2010.

(51) Int. Cl.
*G06F 7/04* (2006.01)

(52) U.S. Cl.
USPC .............. 726/27; 726/26; 726/2; 380/277

(58) Field of Classification Search
None
See application file for complete search history.

(56) References Cited

U.S. PATENT DOCUMENTS

| 7,107,463 B2* | 9/2006 | England et al. ............... 713/193 |
| 2002/0071561 A1* | 6/2002 | Kurn et al. .................... 380/277 |

OTHER PUBLICATIONS

Lazar, Gregory et al., "Providing Secure Access to a Set of Credentials within a Data Security Mechanism of a Data Storage System", U.S. Appl. No. 12/645,857, filed Dec. 23, 2009.

* cited by examiner

*Primary Examiner* — Pramila Parthasarathy
(74) *Attorney, Agent, or Firm* — BainwoodHuang

(57) ABSTRACT

Techniques are provided for providing access to a stored secret using a callback function that generates stable system values. The callback function, which is stored in a library file, is verified by securely storing a signature of the library file and later generating another signature of the library file. Access to the stored secret using the callback function is only permitted when the callback function is verified.

19 Claims, 4 Drawing Sheets

Fig. 2

| | | |
|---|---|---|
| 101 | Preliminary registration operations | |
| 102 | ISSVs := Fn() | |
| 104 | EMK := E(MEK, ISSVs) | 108 |
| 106 | EMK' := E(EMK, SK) | Store in Lockbox |
| 110 | SigTLF := H(LibraryFile, SK) | 114 |
| 112 | SigTLF' := E(SigTLF, ISSVs) | Store in Lockbox |
| 116 | SigTCF := H(ConfigFile, SK) | 120 |
| 118 | SigTCF' := E(SigTCF, ISSVs) | Store in Lockbox |
| 122 | ES := E(S, MEK) | 124 Store in Lockbox |

| | |
|---|---|
| 202 | CSSVs := Fn() |
| 204 | SigTCF := D(SigTCF', CSSVs) → |
| 206 | SigCF := H(ConfigFile, SK) |

208
Compare
SigCF to
SigTCF

| | |
|---|---|
| 210 | SigTLF := D(SigTLF', CSSVs) → |
| 212 | SigLF := H(LibraryFile, SK) |

214
Compare
SigLF to
SigTLF

| | |
|---|---|
| 216 | EMK := D(EMK', SK) |
| 218 | MEK := D(EMK, CSSVs) |
| 220 | S := D(ES, MEK) |

As part of an initialization process:

(1) calculate and store a signature of a trusted library file containing a trusted function usable to generate stable system values (SSVs) of the computer, and (2) calculate and store a first value based on an initial set of SSVs generated by the trusted function, the first value and a second value to be used by an access control function to enable access to a stored secret

320

As part of a use process:

(1) calculate a signature of a loaded library file containing an untrusted function used to generate a current set of SSVs upon which the second value is to be calculated (2) compare the respective signatures of the trusted library file and the loaded library file to generate a comparison result signal, and (3) only when the comparison result signal indicates a successful comparison, permit an access-granting output of the access control function to enable the access to the stored secret

SIGNING A LIBRARY FILE TO VERIFY A CALLBACK FUNCTION

CROSS REFERENCE TO RELATED APPLICATIONS

This Patent Application is a Non-Provisional Utility Application claiming priority to U.S. Provisional Patent Application No. 61/371,373, filed on Aug. 6, 2010, the contents and teachings of which are hereby fully incorporated by reference into this document.

BACKGROUND

Data may be protected by storing it within a secure file of a special security application that only permits access to the data according to certain rules. One way of protecting the data is by ensuring that it is only accessed on the same machine as where the data was first stored. This may be accomplished by the security application reading certain stable system values that are unique to a particular system configuration before permitting access to the stored data.

In some cases, a security application may allow an application accessing the secure file to provide its own callback function to access specific stable system values for additional application-specific security.

SUMMARY

The above-described techniques suffer from deficiencies. For example, if the secure file and security application are copied to another computer, a malicious attacker may be able to provide a counterfeit callback function that falsely reports the stable system values from the original computer, thereby gaining access to the data at an unauthorized location.

In contrast, embodiments of the present invention are directed to techniques for signing a library file containing the callback function and securely storing the signature within the secure file to prevent the use of a counterfeit callback function. In one embodiment, a method is presented for operating a computer to provide access to a stored secret, the stored secret being stored on a computer-readable medium (e.g., in the secure file). The method includes, as part of an initialization process, (1) calculating and storing a signature of a trusted library file containing a trusted function usable to generate stable system values (SSVs) of the computer, and (2) calculating and storing a first value based on an initial set of SSVs generated by the trusted function, the first value and a second value to be used by an access control function to enable the access to the stored secret. The method further includes, as part of a use process, (1) calculating a signature of a loaded library file containing an untrusted function used to generate a current set of SSVs upon which the second value is to be calculated, (2) comparing the respective signatures of the trusted library file and the loaded library file to generate a comparison result signal, and (3) only when the comparison result signal indicates a successful comparison, permitting an access-granting output of the access control function to enable the access to the stored secret. A corresponding computer program product is also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2 illustrates a method according to one or more embodiments.

FIG. 3 illustrates a method according to one or more embodiments.

FIG. 4 illustrates a method according to one or more embodiments.

DETAILED DESCRIPTION

Figure 1:
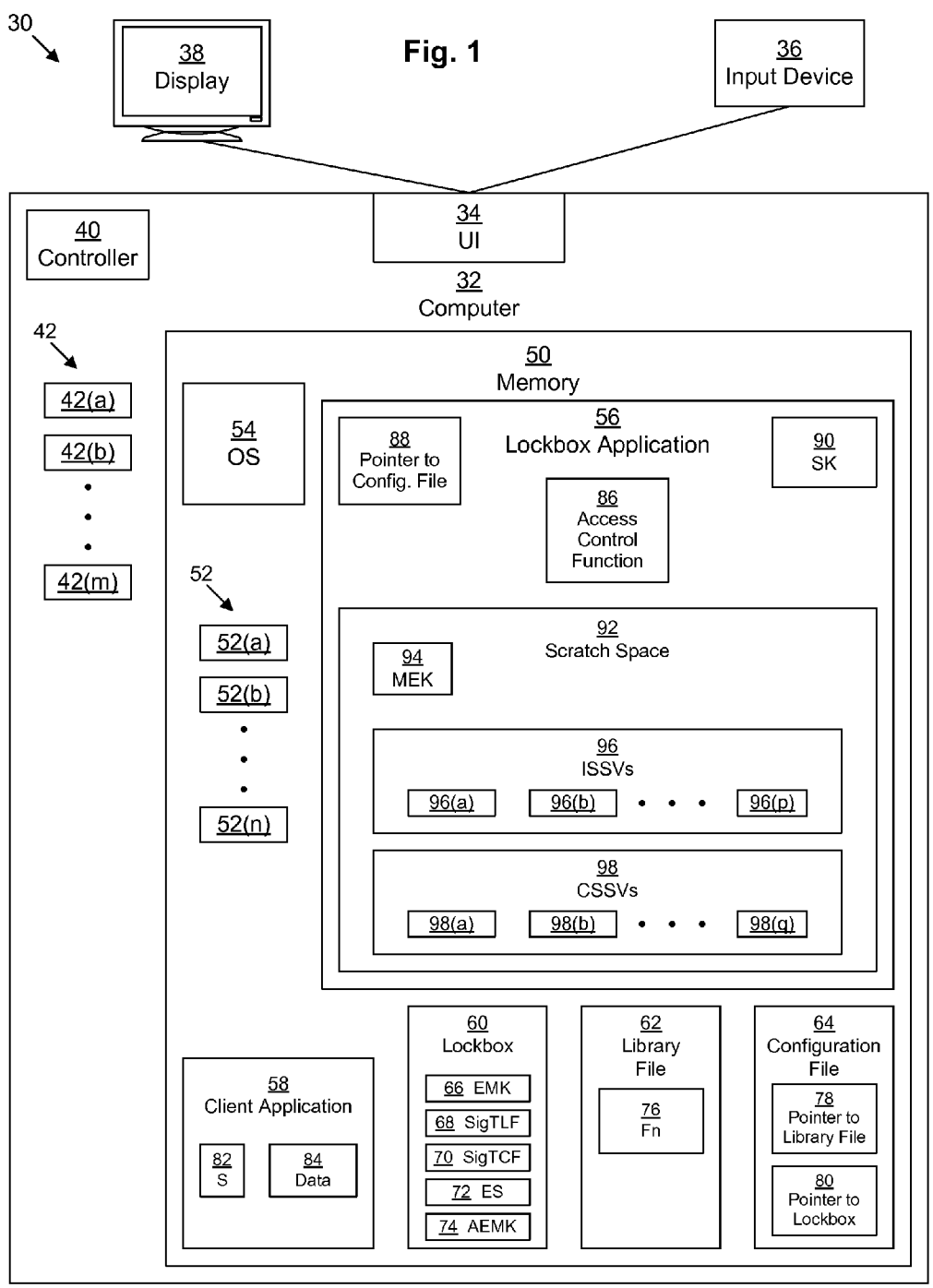
FIG. 1 illustrates a system and apparatus for use in performing various embodiments.

Embodiments of the present invention are directed to techniques for signing a library file containing a callback function and securely storing the signature within a secure file to prevent the use of a counterfeit callback function.

FIG. 1 depicts a computer system 30 for use in practicing various embodiments. Computer system 30 includes a computer 32 having a user interface (UI) 34 connected to one or more input devices 36 (such as, for example, a mouse, keyboard, tracking pad, trackball, touch-screen, tablet, keypad, etc.) and an output device such as display 38 (such as, for example, a computer monitor or an embedded display screen). Computer 32 further includes a controller 40 (such as, for example, a general-purpose microprocessor, a processor, a central processing unit, dedicated circuitry, etc.), a set of stable hardware values 42 (including stable hardware values 42($a$), 42($b$), . . . , 42($m$)) stored, for example, in read-only-memory (ROM) (such as, for example, a media access control or MAC address of a network adaptor, a disk controller serial number, or an ID number or signature of an installed hardware device, etc.), and memory 50. Memory 50 may include one or more of the following: random access memory (RAM), ROM, system memory, volatile memory, non-volatile memory, static RAM, flash memory, non-volatile data storage, optical storage, electromagnetic storage, floppy disk, hard disk, CD-ROM, DVD-ROM, Bluray, etc. Memory 50 stores, inter alia, a set of stable software values 52 (including stable software values 52($a$), 52($b$), . . . , 52($n$)) (such as, for example, serial numbers of the operating system and various other pieces of installed software, parameters stored by the operating system and various other pieces of installed software, etc.), operating system (OS) 54, lockbox application 56, one or more client applications 58, lockbox file 60, library file 62, and configuration file 64.

Lockbox file 60 is a file that securely stores information on behalf of client applications 58, accessible through lockbox application 56. In some embodiments, lockbox file 60 stores data as a set of name-value pairs, the names representing the meaning of the contents of their respective values. The names may be encrypted for further security. The values are also encrypted, as described in further detail below. Lockbox file 60 may include a few specific encrypted data values: encrypted master encryption key (EMK) 66, signature 68 of a trusted library file 62 (SigTLF), signature 70 of a trusted configuration file 64 (SigTCF), encrypted secret (ES) 72, and Attended-mode encrypted master encryption key (AEMK) 74. In some embodiments, lockbox file 60 may be stored in system memory (or another volatile and temporary storage medium), while in other embodiments, lockbox file 60 may be stored on a hard disk (or another permanent or semi-permanent non-volatile storage medium).

Library file 62 may be, for example, a dynamic-link library (DLL) that stores one or more functions callable by software applications. In particular, library file 62 stores a callback function (Fn) 76, which is operable to return the values of a pre-defined set of stable system values (SSVs) read from the computer 32, drawn from the set of stable hardware values 42 and the set of stable software values 52. This callback function 76 may be provided by the client application 58 to provide application-specific security. In some embodiments, library file 62 may store a plurality of callback functions 76, each one associated with a different client application 58. In other embodiments, multiple library files 62 may exist, each one storing a callback function 76 associated with a different client application 58. As an example, if client application 58 is an encrypted storage application, callback function 76 may be set to return the values of the encrypted storage application's serial number, a primary disk controller serial number, an operating system serial number, and a MAC address of a local network adaptor (the values being delivered in a specific order).

Configuration file 64 is a file which stores various configuration data for the lockbox application 56. In one embodiment, configuration file 64 may be written in a markup language (such as, for example, the eXtensible Markup Language or XML). In particular, configuration file 64 may store a pointer 78 to the library file 62 (pointing either to a memory address or to a file path and name) as well as a pointer 80 to the lockbox file 60 (pointing either to a memory address or to a file path and name). In some embodiments, multiple lockbox files 60 are used, in association with multiple client applications 58, and a mapping between client applications 58 and pointers 80 to respective lockbox files 60 is stored as well. Configuration file 64 may also store function headers for functions stored in various library files 62, such as for callback function 76.

Client application 58 may be any application that can make use of securely stored data through lockbox application 56. For example, client application 58 may be an encrypted storage application. As an additional example, client application 58 may be a web browser that is configured to persistently and securely store user passwords for a variety of websites. Client application 58 manages a secret (S) 82. In one embodiment, secret 82 may be an application-specific encryption key for encrypting application-specific data 84 (for example, application-specific data 84 may be the contents of a storage device, or it may be user passwords for websites). In another embodiment, secret 82 may be the application-specific data 84 itself, the client application 58 relying on the lockbox 60 to securely store the application-specific data 84 rather than merely using the lockbox 60 to store the client-specific encryption key with which the client-application 58 encrypts the application-specific data 84.

Lockbox application 56 includes an access control function 86, a pointer 88 to configuration file 64 (pointing either to a memory address or to a file path and name), a secret key (SK) 90, and scratch space 92. Scratch space 92 may be used to temporarily store various values, such as a master encryption key (MEK) 94 for encrypting secret 82, an initial set of SSVs (ISSVs) 96 (including ISSVs 96(a), 96(b), ..., 96(p)), and a current set of SSVs (CSSVs) 98 (including CSSVs 98(a), 98(b), ..., 98(q)), not necessarily at the same time.

In operation, computer system 30 may be initialized and configured to securely store secret 82 in lockbox file 60 (see method 100 in FIG. 2) as well as to securely access secret 82 (see method 200 in FIG. 3). Preliminarily, it should be noted that anytime a piece of software, such as lockbox application 56, is mentioned as performing an action, in fact, controller 40 actually performs the action while running the software.

In general, as part of an initialization process, lockbox application 56 (A) calculates and stores a signature 68 of a trusted library file 62 containing a trusted function 76 usable to generate stable system values (SSVs) of the computer, and (B) calculates and stores a first value based on an initial set of SSVs 96 generated by the trusted function 76, the first value and a second value to be used by an access control function 86 to enable access to a stored secret 82. For example, the first value may be EMK 66 and the second value may be the unencrypted MEK 94. In other embodiments, the first value may be any value generated from the initial set of SSVs 96.

As part of a use process, computer lockbox application 56 (A) calculates a signature SigLF of a loaded library file 62 containing an untrusted function 76 used to generate a current set of SSVs 98 upon which the second value is to be calculated, (B) compares the respective signatures of the trusted library file SigTLF 68 and the loaded library file SigLF to generate a comparison result signal, and (C) only when the comparison result signal indicates a successful comparison, permit an access-granting output of the access control function 86 to enable the access to the stored secret. For example, by properly regenerating MEK 94 and allowing it to be used to decrypt ES 72 or encrypt S 82. In embodiments in which the first value is any value generated from the initial set of SSVs 96, the second value may be another value generated from the current set of SSVs 98 such that if the current set of SSVs 98 and the initial set of SSVs 96 are the same (or sufficiently close), lockbox application 56 is able to determine that the lockbox 60 may be opened.

In more detail, FIG. 2 depicts a method 100 for initializing security parameters in order to securely store secret 82 in lockbox file 60 using computer system 30. Within FIGS. 2 and 3, the following notation is used: E(X, Y) means that value X is encrypted using value Y as a cryptographic key. D(X, Y) means that value X is decrypted using value Y as a cryptographic key. H(X, Y) means that value X is cryptographically hashed using value Y as a cryptographic key. The ":=" operator is used to as an assignment operator—thus, X:=Y means that the value of Y is stored within variable X.

In step 101, preliminary registration operations are performed. In more detail, client application 58 first registers with lockbox application 56 by providing callback function 76 (or, in some embodiments, library file 62) to lockbox application 56, and lockbox application stores a mapping between the particular client application 58 and the particular callback function 76 (and the library file 62 it is contained within). Lockbox application 56 also stores callback function 76 in library file 62 and stores a pointer 78 to the library file 62 in configuration file 64. Lockbox application 56 may also generate master encryption key (MEK) 94 preferably using a large random number sequence seeded with a high entropy value, such as, for example, SK 90. In some embodiments, a different MEK 94 is generated for each client application 58. After receiving callback function 76, lockbox application 56 performs step 102. In step 102, lockbox application 56 (or, in some embodiments, more specifically, access control function 86) executes callback function 76 and stores the result as ISSVs 96 in scratch space 92.

In step 104, lockbox application 56 encrypts MEK 94 using ISSVs 96 as the key, producing encrypted master key (EMK) 66. In some embodiments, step 108 is then performed, in which EMK 66 is stored in lockbox file 60 as a value of a name-value pair (the name being, for example, EMK). In some embodiments, step 106 is performed first, further encrypting EMK 66 with secret key (SK) 90 (known only to lockbox application 56) to produce EMK', EMK' being the value that is actually stored in lockbox file 60 in step 108. In other embodiments the order of steps 104 and 106 is reversed, such that MEK 94 is first encrypted with SK 90 and then encrypted with ISSVs 96.

In one embodiment, in step 104, lockbox application 56 encrypts MEK 94 with ISSVs 96 as the key using a (q of p) Bloom-Shamir split secret algorithm, such algorithms being well-understood in the art. The output EMK 66 may later be decrypted without necessarily correctly reproducing all of the ISSVs 96(a)-96(p). Thus, although EMK 66 is encrypted using p ISSVs 96(a)-96(p), q correct SSVs are enough to successfully recover MEK 94 for some p≧q. For example, in one embodiment, p may be equal to 10 (representing 10 SSVs produced by callback function 76), but q may equal 7, which allows for up to three SSVs to change, while still allowing MEK 94 to be recovered successfully. Thus, even if computer system 30 undergoes minor adjustments (for example, a network card is swapped out, thereby changing the MAC address), it will not interfere with the ability to access the lockbox 60.

In some embodiments, not depicted, lockbox application 56 also encrypts MEK 94 using a user-input passphrase as key and stores this result in lockbox 60 as AEMK 74 (optionally further encrypting AEMK 74 with SK 90). AEMK 74 represents an alternate way to reconstruct MEK 94 without using SSVs, as will be described in further detail with respect to FIG. 3.

In step 110, lockbox application 56 hashes library file 62 with SK 90 to generate a signature (SigTLF) 68 of trusted library file 62. It should be understood that, at this point, library file 62 is considered to be trusted because it has just been provided by client application 58. The hashing may be done with, for example, a hash-based message authentication code (HMAC) scheme. SigTLF 68 may then be stored in lockbox file 60 in step 114. Step 112, which may optionally be performed prior to step 114, further encrypts SigTLF 68 with ISSVs 96 (in some embodiments, also using a Bloom-Shamir split secret algorithm) to generate SigTLF', SigTLF' being the value actually stored in lockbox file 60. In some embodiments, step 110 hashes library file 62 using ISSVs 96 as the key rather than SK 90, and in some embodiments, step 112 encrypts SigTLF 68 using SK 90 instead of ISSVs 96.

In optional step 116, lockbox application 56 hashes configuration file 64 with SK 90 to generate a signature (SigTCF) 70 of trusted configuration file 64. This hashing may be done with, for example, a hash-based message authentication code (HMAC) scheme. SigTCF 70 may then be stored in lockbox file 60 in step 120. Step 118, which may optionally be performed prior to step 120, further encrypts SigTCF 70 with ISSVs 96 (in some embodiments, also using a Bloom-Shamir split secret algorithm) to generate SigTCF', SigTCF' being the value actually stored in lockbox file 60. In some embodiments, step 116 hashes configuration file 64 using ISSVs 96 as the key rather than SK 90, and in some embodiments, step 118 encrypts SigTCF 70 using SK 90 instead of ISSVs 96. It should be understood that steps 116-120 are optional because, in some embodiments, we are not worried about a malicious attacker altering the contents of configuration file 64.

At this point, the initialization process has been completed. In many cases, immediately after initialization, client application 58 will attempt to store secret 82 in the lockbox 60. In order to do so, step 122 may be performed within method 100. In step 122, lockbox application 56 encrypts secret 82 using MEK 94 as the encryption key to generate encrypted secret (ES) 72. Lockbox application 56 then, in step 124, stores ES 122 in lockbox file 60. In some embodiments (not depicted), ES 72 is further encrypted using SK 90 prior to being stored in lockbox file 60.

After initializing the security for a client application and securely storing secret 82, temporary values 94 and 96 are deleted from scratch space 92 to preserve security. This effectively "closes" the lockbox 60 and terminates the initialization process, so, if client application 58 later wishes to store additional secrets 82 or to alter the stored value of a secret 82, method 200 should be used to re-open the lockbox 60 and to verify the trustworthiness of the library file 62 and to regenerate MEK 94.

Thus, using method 100, secret 82 is securely stored in lockbox 60 together with a signature 68 of a trusted library file 62 to ensure that the library file 62 is not modified to circumvent the SSV protections.

FIG. 3 depicts a method 200 for "opening" lockbox 60 so that secret 82 can be securely accessed or altered using computer system 30. In step 202, lockbox application 56 (or, in some embodiments, more specifically, access control function 86) runs callback function 76 and stores the result as CSSVs 98. In more detail, when client application 58 wishes to retrieve secret 82 from lockbox 60 (or to alter secret 82 or to store a new secret 82 in lockbox 60), it sends a request to lockbox application 60. Lockbox application 60 then retrieves callback function 76 from library file 62 (which at this point is no longer trusted, because since it has been created, a malicious attacker may have altered its contents) and runs callback function 76 to generate a current set of SSVs—CSSVs 98—which are stored in scratch space 92.

In theory, at this point, CSSVs 98 could be used to attempt to regenerate MEK 94. However, prior attempting to do so, it is prudent to make sure (a) that the callback function 76 has not been altered, and preferably also (b) that the CSSVs 98 match the ISSVs 96 (at least to a q of p extent). Thus, lockbox application 56 performs steps 204-218 (minimally performing at least steps 212 and 214, and preferably also performing step 210 to verify that the SSVs match) as described below.

Steps 204-208 serve to guarantee that the configuration file has not been altered (for example, by pointing to an incorrect library file 62). These steps are optional. In step 204, SigTCF 70 is regenerated by reading SigTCF' from the lockbox file 60 (if step 118 was performed in method 100—otherwise, SigTCF 70 may be read directly from lockbox file 60 and execution may proceed directly to step 206) and decrypting it using CSSVs 98 (using a q of p Bloom-Shamir split secret algorithm according to some embodiments) to regenerate SigTCF 70. Step 204 (in conjunction with related step 118) not only helps by ensuring that a malicious attacker cannot successfully make an alteration merely by cracking the value of SK 90, but step 204 (in conjunction with step 118) also helps ensure that CSSVs 98 are correct, because otherwise, sigTCF would be regenerated incorrectly. In step 206, lockbox application 56 loads configuration file 64 (which, at this point, is no longer trusted because it is possible that it has been altered since the lockbox 60 was last closed) and generates a new signature SigCF of loaded (untrusted) configuration file 64 by hashing loaded configuration file 64 with SK 90. In some embodiments, the order of steps 204 and 206 may be reversed. In some embodiments, step 206 hashes loaded configuration file 64 using CSSVs 98 as the key rather than SK 90, and in some embodiments, step 204 decrypts SigTCF' using SK 90 instead of CSSVs 98. In step 208, lockbox application 56 compares SigCF to SigTCF 70, and if they do not match, a security precaution is taken, such as denying access to the lockbox 60. If they do not match, it means that configuration file 64 has been altered since initialization (or, if step 204 is performed, it may instead mean that the SSVs have changed since initialization).

Steps 210-214 serve to guarantee that the library file has not been altered (for example, by altering callback function 76 to produce counterfeit SSVs). In step 210, SigTLF 68 is regenerated by reading SigTLF' from the lockbox file 60 (if step 112 was performed in method 100—otherwise, SigTLF 68 may be read directly from lockbox file 60 and execution may proceed directly to step 212) and decrypting it using CSSVs 98 (using a q of p Bloom-Shamir split secret algorithm according to some embodiments) to regenerate SigTLF 68. Step 210 (in conjunction with related step 112) not only helps by ensuring that a malicious attacker cannot successfully make an alteration merely by cracking the value of SK 90, but step 210 (in conjunction with step 112) also helps ensure that CSSVs 98 are correct, because otherwise, sigTLF would be regenerated incorrectly. In step 212, lockbox application 56 loads library file 62 (which, at this point, is no longer trusted because it is possible that it has been altered since the lockbox 60 was last closed) and generates a new signature SigLF of loaded (untrusted) library file 62 by hashing loaded library file 62 with SK 90. In some embodiments, the order of steps 210 and 212 may be reversed. In some embodiments, step 212 hashes loaded library file 62 using CSSVs 98 as the key rather than SK 90, and in some embodiments, step 210 decrypts SigTLF' using SK 90 instead of CSSVs 98. In step 214, lockbox application 56 compares SigLF to SigTLF 68, and if they do not match, a security precaution is taken, such as denying access to the lockbox 60. If they do not match, it means that library file 62 has been altered since initialization (or, if step 210 is performed, it may instead mean that the SSVs have changed since initialization).

Once step 214 (and optionally step 208) has been successfully performed, indicating that library file 62 (and, hence, callback function 76) is trusted (and, if performed in conjunction with step 204 or 210, that CSSVs 98 match ISSVs 96), lockbox application 56 can perform steps 216-218 to regenerate MEK 94. In some embodiments, it can instead be verified that CSSVs 98 match ISSVs 96 using other techniques.

In step 216, EMK 66 is regenerated by reading EMK' from the lockbox file 60 (if step 106 was performed in method 100—otherwise, EMK 66 may be read directly from lockbox file 60 and execution may proceed directly to step 212) and decrypting it using SK 90. Step 216 (and related step 106) helps by ensuring that a malicious attacker cannot bypass lockbox application 56 by correctly regenerating MEK 94 merely by knowing the ISSVs 96 with which MEK 94 can be decrypted, since the malicious attacker would also need to know secret SK 90. In step 218, lockbox application 56 decrypts EMK 66 using CSSVs 98 as the key to regenerate MEK 94 (using a q of p Bloom-Shamir split secret algorithm according to some embodiments).

Once lockbox application 56 has successfully regenerated MEK 94 in step 218, lockbox 60 has been opened and it can proceed to perform step 220 and decrypt ES 72 from the lockbox to regenerate S 82. In some embodiments (not depicted), ES 72 is first decrypted using SK 90 prior to being decrypted using MEK 94.

Alternatively, instead of performing step 220, if client application 58 desires to store a new value S 82 in lockbox 60 (or to alter the value of S 82), step 122 can be performed as part of method 200 instead of step 220.

Upon termination of a session with the client application 58, lockbox 60 should again be closed by deleting MEK 94 from the scratch space 92. Method 300 can be performed again at a later time if the lockbox needs to be re-opened.

Thus, using method 200, secret 82 is securely retrieved from (or re-stored in) lockbox 60 by ensuring that signature 68 of a library file 62 is valid to ensure that the library file 62 has not been modified to circumvent the SSV protections.

It should be understood that, in some embodiments, method 200 is generally only used when lockbox application 56 is run in a "system" or unattended mode of operation. However, in an attended mode of operation (i.e., when a system administrator is present), lock box 60 may be opened by using AEMK 74 instead of EMK 66, and using callback function 76 and calculating signatures is not done. In attended mode, system administrator, upon attempting to access a secret 82 stored in lock box file 60, enters the passphrase, which lockbox application 56 is able to use to decrypt AEMK 74 and regenerate MEK 94 without reference to SSVs. There is no need to verify the system hardware, because it is inferred from use of the secure passphrase that the system administrator is not a malicious attacker (since the passphrase is preferably highly secure).

FIG. 4 depicts method 300, which depicts an embodiment at a more general level. In step 310, as part of an initialization process, computer 32 (e.g, by running lockbox application 56) (1) calculates and stores a signature (e.g., 68) of a trusted library file (e.g., 62) containing a trusted function (e.g., 76) usable to generate stable system values (SSVs) of the computer, and (2) calculates and stores a first value (e.g., EMK 66) based on an initial set of SSVs (e.g., 96) generated by the trusted function (e.g., 76), the first value (e.g., 66) and a second value (e.g., MEK 94, to be regenerated later in step 320) to be used by an access control function (e.g., 86) to enable access to a stored secret (e.g., 82).

In step 320, as part of a use process, computer 32 (e.g, by running lockbox application 56) (1) calculates a signature (e.g., SigLF) of a loaded library file (e.g., 62) containing an untrusted function (e.g., 76) used to generate a current set of SSVs (e.g., 98) upon which the second value (e.g., 94) is to be calculated, (2) compares the respective signatures of the trusted library file (e.g., SigTLF 68) and the loaded library file (e.g., SigLF) to generate a comparison result signal, and (3) only when the comparison result signal indicates a successful comparison, permit an access-granting output of the access control function (e.g., 86) to enable the access to the stored secret (e.g., by properly regenerating MEK 94 and allowing it to be used to decrypt ES 72 or encrypt S 82).

While various embodiments of the invention have been particularly shown and described, it will be understood by those skilled in the art that various changes in form and details may be made therein without departing from the spirit and scope of the invention as defined by the appended claims.

For example, while various steps have been described in a particular order, various embodiments may alter the order of performance without departing from the invention. Thus, any order of performance of the disclosed steps is hereby disclosed, except to the extent that any particular order or performance is logically impossible.

It should be understood that although various embodiments have been described as being methods, software embodying these methods is also included. Thus, one embodiment includes a tangible, non-transitory, computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of operating a computer to provide access to a stored secret, the stored secret being stored on a non-transitory computer-readable medium, the method comprising:
as part of an initialization process, (1) calculating and storing a signature of a trusted library file containing a trusted function usable to generate stable system values (SSVs) of the computer, and (2) calculating and storing a first value based on an initial set of SSVs generated by the trusted function, the first value to be used by an access control function to enable the access to the stored secret; and
as part of a use process, (1) calculating a signature of a loaded library file containing an untrusted function used to generate a current set of SSVs, (2) comparing the respective signatures of the trusted library file and the loaded library file to generate a comparison result signal, and (3) only when the comparison result signal indicates a successful comparison, permitting an access-granting output of the access control function to enable the access to the stored secret.

2. The method of claim 1 wherein the method further comprises, within the initialization process, (3) receiving the trusted function from an application, and (4) receiving the stored secret from the application.

3. The method of claim 2 wherein the application is an encrypted storage application and the stored secret is an encryption key used by the encrypted storage application.

4. The method of claim 1 wherein:
calculating and storing the first value includes encrypting a master encryption key using the initial set of SSVs to generate the first value, wherein the master encryption key is used to encrypt the stored secret; and
permitting the access-granting output of the access control function to enable the access to the stored secret includes:
decrypting the first value using the current set of SSVs to generate a second value; and
decrypting the stored secret using the second value.

5. The method of claim 4 wherein:
encrypting the master encryption key includes processing the master encryption key through an M of N Bloom-Shamir split secret algorithm using the initial set of SSVs, wherein N represents the number of elements in the initial set of SSVs and M is less than N; and
decrypting the first value includes providing M values from the current set of SSVs that match respective values from the initial set of SSVs.

6. The method of claim 4 wherein:
calculating and storing the first value further includes further encrypting the master encryption key using a secret key known only to the access control function; and
permitting the access-granting output of the access control function to enable the access to the stored secret further includes further decrypting the first value using the secret key.

7. The method of claim 6 wherein calculating and storing the signature includes cryptographically hashing the trusted library file with the secret key to generate the signature.

8. The method of claim 1 wherein the method further comprises:
within the initialization process, (3) storing a pointer to the trusted library file in a configuration file, (4) generating a signature of the configuration file, (5) encrypting the signature of the configuration file to generate an encrypted signature of the configuration file, and (6) storing the encrypted signature of the configuration file; and
within the use process, (4) validating the configuration file by:
decrypting the encrypted signature of the configuration file to generate a regenerated signature of the library file;
generating a current signature of the configuration file;
comparing the current signature of the configuration file to the regenerated signature of the configuration file; and
if the comparison fails, then refraining from decrypting the secret, otherwise proceeding to generate the comparison result signal.

9. The method of claim 1 wherein:
calculating and storing the first value includes encrypting a master encryption key using the initial set of SSVs to generate the first value, wherein the master encryption key is used to encrypt the stored secret; and
only when the comparison result signal indicates a successful comparison, permitting the access-granting output of the access control function to enable the access to the stored secret includes:
if the comparison result signal does not indicate a successful comparison, then refraining from enabling the access to the stored secret; and
if the comparison result signal indicates a successful comparison, then:
generating the current set of SSVs using the untrusted function;
decrypting the first value using the current set of SSVs to generate a master encryption key candidate; and
decrypting the stored secret using the master encryption key candidate, the decrypting only being successful if the master encryption key candidate is equal to the master encryption key.

10. The method of claim 9 wherein:
encrypting the master encryption key includes processing the master encryption key through an M of N split secret algorithm using the initial set of SSVs, wherein N represents the number of elements in the initial set of SSVs and M is less than N; and
decrypting the first value includes providing M values from the current set of SSVs that match respective values from the initial set of SSVs.

11. A computer program product comprising a non-transitory computer-readable medium storing computer code, which, upon execution by a computer, causes the computer to:
as part of an initialization process, (1) calculate and store a signature of a trusted library file containing a trusted function usable to generate stable system values (SSVs) of the computer, and (2) calculate and store a first value based on an initial set of SSVs generated by the trusted function, the first value to be used by an access control function to enable access to a stored secret; and
as part of a use process, (1) calculate a signature of a loaded library file containing an untrusted function used to generate a current set of SSVs, (2) compare the respective signatures of the trusted library file and the loaded library file to generate a comparison result signal, and (3) only when the comparison result signal indicates a successful comparison, permit an access-granting output of the access control function to enable the access to the stored secret.

12. The computer program product of claim 11 wherein the code, upon execution by the computer, causes the computer to, within the initialization process, (3) receive the trusted function from an application, and (4) receive the stored secret from the application.

13. The computer program product of claim 12 wherein the application is an encrypted storage application and the stored secret is an encryption key used by the encrypted storage application.

14. The computer program product of claim 11 wherein the code, upon execution by the computer:
when calculating and storing the first value, causes the computer to encrypt a master encryption key using the initial set of SSVs to generate the first value, wherein the master encryption key is used to encrypt the stored secret; and
when permitting the access-granting output of the access control function to enable the access to the stored secret, causes the computer to:
decrypt the first value using the current set of SSVs to generate a second value; and
decrypt the stored secret using the second value.

15. The computer program product of claim 14 wherein the code, upon execution by the computer:
when encrypting the master encryption key, causes the computer to process the master encryption key through an M of N Bloom-Shamir split secret algorithm using the initial set of SSVs, wherein N represents the number of elements in the initial set of SSVs and M is less than N; and
when decrypting the first value, causes the computer to provide M values from the current set of SSVs that match respective values from the initial set of SSVs.

16. The computer program product of claim 14 wherein the code, upon execution by the computer:
when calculating and storing the first value, further causes the computer to further encrypt the master encryption key using a secret key known only to the access control function; and
when permitting the access-granting output of the access control function to enable the access to the stored secret, further causes the computer to further decrypt the first value using the secret key.

17. The computer program product of claim 16 wherein the code, upon execution by the computer, when calculating and storing the signature, causes the computer to cryptographically hash the trusted library file with the secret key to generate the signature.

18. The computer program product of claim 11 wherein the code, upon execution by the computer, further causes the computer to:
within the initialization process, (3) store a pointer to the trusted library file in a configuration file, (4) generate a signature of the configuration file, (5) encrypt the signature of the configuration file to generate an encrypted signature of the configuration file, and (6) store the encrypted signature of the configuration file; and
within the use process, (4) validate the configuration file by:
decrypting the encrypted signature of the configuration file to generate a regenerated signature of the library file;
generating a current signature of the configuration file;
comparing the current signature of the configuration file to the regenerated signature of the configuration file; and
if the comparison fails, then refraining from decrypting the secret, otherwise proceeding to generate the comparison result signal.

19. An apparatus comprising:
a user-interface;
memory, the memory storing stable values; and
a controller, the controller being configured to:
as part of an initialization process, (1) calculate and store in memory a signature of a trusted library file from memory containing a trusted function usable to generate stable system values (SSVs) of the computer based on the stable values stored in memory, and (2) calculate and store in memory a first value based on an initial set of SSVs generated by the trusted function, the first value and a second value to be used by an access control function to enable access to a stored secret stored in memory; and
as part of a use process, (1) calculate a signature of a loaded library file from memory containing an untrusted function used to generate a current set of SSVs, (2) compare the respective signatures of the trusted library file from memory and the loaded library file to generate a comparison result signal, and (3) only when the comparison result signal indicates a successful comparison, permit an access-granting output of the access control function to enable the access to the stored secret in memory.

* * * * *